US008335163B2

(12) United States Patent
Li et al.

(10) Patent No.: US 8,335,163 B2
(45) Date of Patent: Dec. 18, 2012

(54) QUALITY OF SERVICE (QOS) BASED SYSTEMS, NETWORKS, AND ADVISORS

(75) Inventors: Jin Li, Sammamish, WA (US); Cheng Huang, Redmond, WA (US); Ye Wang, New Haven, CT (US); Richard R Yang, New Haven, CT (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 12/606,882

(22) Filed: Oct. 27, 2009

(65) Prior Publication Data

US 2011/0096675 A1 Apr. 28, 2011

(51) Int. Cl.
*H04J 1/16* (2006.01)
(52) U.S. Cl. ........ 370/248; 370/252; 709/224; 709/228
(58) Field of Classification Search .................. 370/248, 370/252; 709/224, 228
See application file for complete search history.

(56) References Cited

U.S. PATENT DOCUMENTS

| | | | |
|---|---|---|---|
| 5,793,976 | A | 8/1998 | Chen et al. |
| 2002/0065932 | A1* | 5/2002 | Kobayashi ............. 709/233 |
| 2005/0117580 | A1* | 6/2005 | del Val et al. ............ 370/395.2 |
| 2005/0246347 | A1* | 11/2005 | Kobayashi ............. 707/10 |
| 2006/0159017 | A1 | 7/2006 | Mun et al. |
| 2007/0189293 | A1 | 8/2007 | Yamada et al. |
| 2008/0222637 | A1* | 9/2008 | Dickenson ............. 718/100 |
| 2009/0010264 | A1 | 1/2009 | Zhang |
| 2009/0097554 | A1* | 4/2009 | Savoor et al. .......... 375/240.08 |
| 2009/0300349 | A1* | 12/2009 | Hashimoto et al. .......... 713/156 |
| 2010/0008240 | A1* | 1/2010 | Ee et al. .............. 370/252 |
| 2010/0165857 | A1* | 7/2010 | Meylan et al. ............ 370/252 |

OTHER PUBLICATIONS

Arango, "Providing End-to-End Network QoS via Overlay Networks and Bandwidth On-demand", retrieved on Jun. 18, 2009 at <<http://www.icin.biz/files/programmes/Session6B-2.pdf>>, Sun Microsystems, 6 pages.

Bai, et al., "Layered view of QoS issues in IP-based mobile wireless networks", retrieved on Jun. 18, 2009 at <<http://cs.ou.edu/~database/documents/06-IJCS-Bailayered-Qos.pdf>>, International Journal of Communication Systems, John Wiley & Sons, Ltd., vol. 19, 2006, pp. 141-161.

Joshi, et al., "End-to-End QoS over Internet", retrieved on Jun. 18, 2009 at <<http://dspace.library.iitb.ac.in/jspui/bitstream/10054/589/1/462021.pdf>>, 2 pages.

Ma, et al., "A Carrier Grade Peer-to-Peer Network Architecture", retrieved on Jun. 18, 2009 at <<http://ieeexplore.ieee.org/stamp/stamp.jsp?tp=&arnumber=4542277&isnumber=4542234>>, ZTE USA Inc, ITU, 2008, 4 pages.

Menasce, "Automatic QoS Control", retrieved on Jun. 18, 2009 at <<http://ieeexplore.ieee.org/stamp/stamp.jsp?tp=&arnumber=1167347&isnumber=26323>>, IEEE Computer Society, IEEE Internet Computing, Jan.-Feb. 2003, pp. 92-95.

Sharma, et al., "Component-Based Dynamic QoS Adaptations in Distributed Real-Time and Embedded Systems", retrieved on Jun. 18, 2009 at <<http://dist-systems.bbn.com/papers/2004/DOA/SharmaDOA_cameraready.pdf>>, BBN Technologies, 18 pages.

* cited by examiner

*Primary Examiner* — Andrew Lee
(74) *Attorney, Agent, or Firm* — Lee & Hayes, PLLC

(57) ABSTRACT

Techniques and technologies for routing communications based on Quality of Service (QOS) related information. More particularly, this document discloses techniques and technologies for selecting communications paths which partially overlap other communication paths for which QOS related information has been measured. The techniques and technologies include determining, performance levels for path segments within the communication paths from the measured QOS information.

20 Claims, 6 Drawing Sheets

QUALITY OF SERVICE (QOS) BASED SYSTEMS, NETWORKS, AND ADVISORS

While most communication systems function well much of the time, from time-to-time they do suffer from a certain degree of unpredictability in their performance. As the degree of complexity in the system increases, the chances that one or more portions of the system might experience unsatisfactory performance increases. For instance, suppose that a particular entity (here entity A) is a VoIP (Voice Over Internet Protocol) client on a particular computer which calls another entity (here entity B), which uses a phone on a PSTN (Public Switched Telephone Network) network. The foregoing outwardly simple process might involve multiple servers and multiple network segments. More particularly, entity A might first need to reach a media server at the VoIP provider. In order to do that, entity A might need to enlist the help of a gateway server or relay server so that it can traverse a NAT (Network Address Translation) Firewall at the VoIP provider. The media server might further sit behind one or more load balancing devices, so that the system may choose to use an appropriate media server to service the particular call. Then, the media server might need to translate the VoIP packets (arising from entity A) into a format acceptable to the PSTN gateway server, which will further deliver the voice signal conveyed by the voice packets through the PSTN network and to the phone.

The particular process described above thus needs at least the service of several devices: 1) the gateway server, 2) the load balancing device, 3) the media server, and 4) the PSTN gateway server. Moreover, the voice signal involved also traverses at least the following network segments: 1) the network segment from the client to the gateway server, 2) the network segment from the gateway server to the load balancing devices, 3) the network segment from the load balancing device to the media server, and 4) the network segment from the media server to the PSTN gateway server. Some of the network segments (for instance the network segments between the gateway server and the load balancing device) can be very short. Moreover, these network segments may even be on the same network switches so that they are unlikely to experience significant performance problems. It might also be worth noting that network segments can include a portion of a communication path (i.e., a bus or other medium), an entity, a device, or combinations thereof.

Some other network segments, (for instance, the network segments between the client and the gateway server and between the load balancing device and the media server) can be quite long and involve multiple network routers and switches. In addition, the VoIP packets may need to compete against other data packets (for instance, those data packets arising from web browsing, email, file transfers, and/or media streaming). Furthermore, entity A may be on a 802.11 WiFi network, which might suffer from a weak wireless signal, fading, and/or interference.

Any of the above described issues (and/or other issues) might cause poor performance levels for communications between entity A and entity B. For instance, at times, heavy network traffic may bog down a network, particular nodes in the network, or particular paths or network segments within the network. In other situations, or in addition, one or more of the servers (or other devices) in the system may become overloaded. Numerous other factors may also affect the performance of typical networks. For instance, noise on the WiFi network and/or malfunctioning servers, routers, etc. can also cause decreased performance of the network or portions thereof The varying performance level of a network will affect some applications and/or services, more than others. For instance, VoIP applications (which demand low-delay communications between entities on the network) will exhibit somewhat greater susceptibility to network performance variations than applications which transfer data on a less frequent basis or which can afford to re-transmit data to recover from performance issues. Instant messaging, VoIP, videoconferencing, remote desktop, and teleconferencing applications/services represent some of these network-performance-sensitive applications.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed description that is presented later.

This document discloses techniques and technologies for a Quality of Service (QOS) based service advisor system which, in some embodiments, operates a communication system that includes more than one entity and/or more than one communication path over which the entities communicate. In such systems a particular communication path involved in a particular communication may involve one or more network segments, and/or one or more servers or other devices. The QOS service advisor of these embodiments receives submittals from the communicating entities and which contain indications of the performance levels of the communication path involved in a particular communication. The QOS service advisor also determines, from these submittals, the network segments, entities, and/or devices involved in the communication. The communication paths corresponding to the submittals are partially disjoint and partially overlapping with other communication paths (which might correspond to other submittals). The server may use multiple submittals to determine and then output an indication of the determined performance level of individual network segments, components, servers, devices, etc. of the communication path(s). As such, the QOS service advisor may also be used to troubleshoot inadequately provisioned network segments, components, servers, devices, etc., to predict the performance level of other communication paths, to reroute communications around network segments of the system suffering from relatively low performance, and to adjust communication components and/or algorithms (for instance, increase a forward error correction level and/or increase the size of a de jitter buffer) to improve the quality of service of communications over the system.

To the accomplishment of the foregoing and related ends, certain illustrative aspects are described herein in connection with the following description and the annexed drawings. These aspects are indicative of various ways in which the disclosed subject matter may be practiced, all of which are intended to be within the scope of the disclosed subject matter. Other advantages and novel features may become apparent from the following detailed description when considered in conjunction with the drawings.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
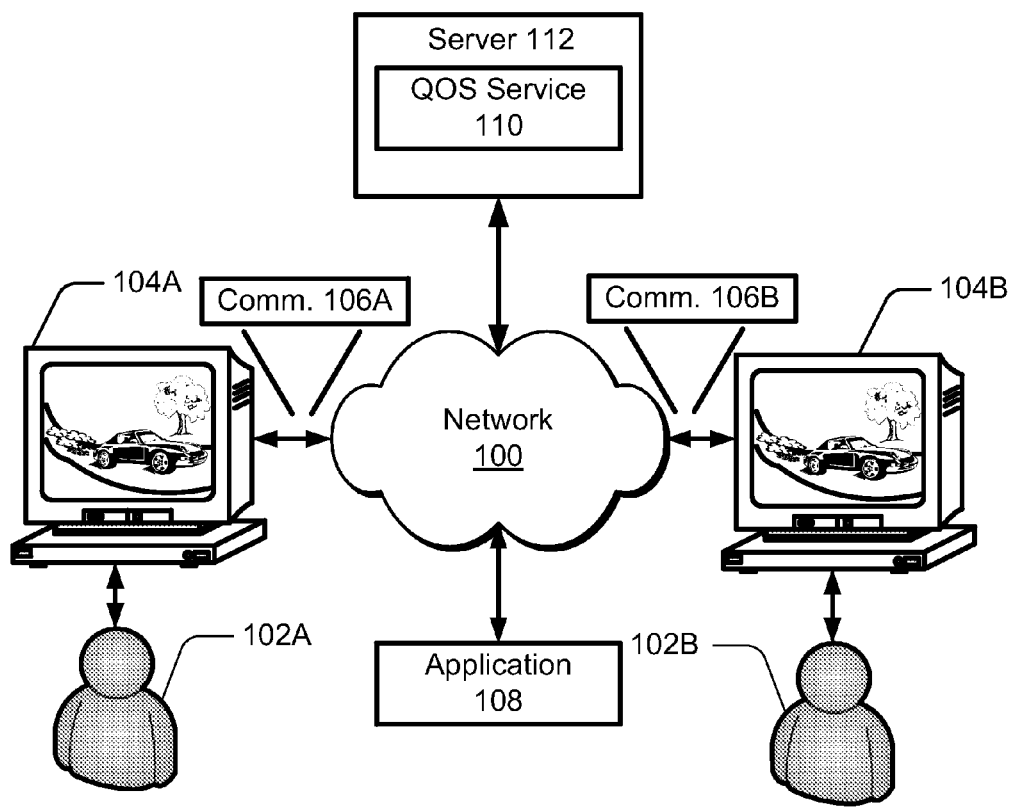
FIG. 1 is an illustrative schematic diagram of a network.

This document describes tools for handling communications between peers and other entities in networked environments. More particularly, this document discloses Quality of Service or QOS based service advisor systems in which the clients measure QOS performance levels of various communication paths in the networks. The clients also submit the resulting information to a server. The server receives the QOS information and determines QOS performance levels of communication paths which are partially disjoint and partially overlapping with the communication paths for which the clients reported the QOS performance levels. The server also outputs an indication of the determined QOS performance levels of these disjoint/overlapping communication paths. The QOS service advisor of some embodiments may be used to troubleshoot inadequately provisioned network segments and/or servers, to predict the performance level of a new communication path, reroute communications around communication path segments which exhibit low performance, adjust communication algorithms (for instance, increase the forward error correction level and/or increase the size of the de jitter buffer of systems having such mechanisms) to improve the quality of service of communications through these systems.

More specifically, this document discloses illustrative instances of QOS applications which are hosted by a network in which various entities route communications based on the determined QOS performance levels. This document also discloses a network wherein the various hosted entities route communications according to such determined QOS performance levels. Additionally, this document discloses client/server systems which measure QOS performance levels and, from the measured QOS performance levels, assemble routes for various communications which traverse the networks.

Furthermore, this document discloses various QOS-based methods for routing communications within a network and/or between networks. For instance, this document discloses a method by which a client measures QOS performance levels and submits the measurements to a server. In another disclosed method, the client (or even another client) queries the server to obtain determined QOS performance levels for a communication path, which is partially disjoint and partially overlapping with the communication paths for which a client has submitted measured QOS performance levels. The client may use the network QOS information to adjust parameters in its communication algorithm (for instance the number of redundancies used in a forward error correction algorithm or a de jitter buffer level) which might improve the QOS experienced by the end user. Another method disclosed by this document includes a server determining, from measured QOS performance levels which were submitted by the clients, QOS performance levels for communication paths which are partially disjoint and partially overlapping the communication paths for which the clients submitted the measured QOS performance levels.

In other disclosed methods, a QOS-based routing system includes a server and one (or more) clients, which include various aspects of the methods disclosed herein and their equivalents. In addition, this document discloses various computer readable storage media for storing computer executable instructions which when executed perform a computer to execute the methods disclosed herein and their equivalents.

FIG. 1 depicts an illustrative schematic diagram of a communication system or network 100. As illustrated by FIG. 1, a pair of users 102A and B use the network 100 via a pair of computers 104A and B (or other computing devices) to exchange various communications 106A and B while using applications 108. While FIG. 1 illustrates a particular network 100 with only two users 102 and one communication path there between, many networks 100 may be used by numerous users 102, and contain numerous network segments and servers (and other devices), and which can even contain or communicate with other networks. Although not shown in FIG. 1, the network 100 may include various communications and data handling equipment such as modems, routers, servers, gateways, etc. which facilitate transferring the communications 106A and B between the users 102. For instance, as play on a network-based gaming application unfolds, one computer 104A might transmit a communication 106A conveying control inputs from user 102A to the computer 104B. Responsive thereto, computer 104B might return a communication 106B with updated graphics data to computer 104A for display thereon and conveying the effects of the control inputs from user 102A.

As these communications 106A and B traverse the network 100, the network 100 and portions thereof operate at certain performance levels characterized by criteria such as throughput, data loss rates, latency, etc. which a QOS service 110 measures. Moreover, the QOS service 110 routes communications 106A and B through (and to/from) the network 100 based on the measured QOS performance levels. It might be worth noting at this juncture that the QOS service 110 can be hosted by a server 112 and/or one or more of the computers 104. Moreover, the QOS service 110 can be operated by or contained within a particular network or can be separate from a particular network. In addition, or in the alternative, the QOS service 110 can be owned, operated, or controlled by an ISP or other organization (for instance, an enterprise).

In the illustrative network 100 shown in FIG. 1, the users 102 happen to be playing an interactive game with each other via the network 100 and computers 104. As such, the users 102 cause information (i.e., communications 106A and B) to be streamed between the two computers 104. Often, the users 102 desire the interactive game to simulate a real-time experience.

To effectuate these desires of the users 102, the network 100 strives to stream these communications 106A and B to the users 102 (i.e., their respective computers 104) at a speed and latency selected to simulate the pace and information content associated with real-world experiences similar to those involved in the interactive game. The interactive game is thus said to perform or occur in real-time. The term "real-time" is accordingly subjective. More particularly, what might be considered "real-time" is determined in part by the desires of the users 102, the capabilities of the particular network 100, the capabilities known to these particular users 102 (who may or may not be informed regarding capabilities available from other networks), etc. Nonetheless, the capabilities (and limitations) of the network 100 and the computers 104 often determine whether or not the overall network 100 can provide an interactive experience sufficiently responsive to the inputs and sensory perceptions of the users 102 to provide what the users 102 subjectively feel simulates a real-time experience. If the communication path 100 suffers from insufficient bandwidth, excessive packet loss (burst or otherwise), long delay in delivery, excessive change in delivery latency (jitter), instability, etc. the interactive experience may suffer.

Thus, given a configuration for the network 100, whether the network 100 delivers a real-time simulation depends on whether the network tends to exploit its underlying capabilities more than other networks currently available. As a result, those networks 100 which users deem to be real-time tend to minimize disruptions to the interactive experience perceived by the users 102. To do so, real-time networks such as the network 100 disclosed herein typically have a selected quality of service (QOS) which they operate to meet or exceed. Often a user 102 specifies the QOS level in terms of certain performance parameters (many of which are associated with the communications 106A and B) such as latency, packet (or data) loss rate, bandwidth, throughput, etc. This document discloses techniques and technologies for improving the performance of networks 100 (real-time or otherwise) by routing communications 106A and B based on QOS performance levels determined from measured QOS performance levels (but for communication paths which are disjoint/overlapping with the communication paths for which the QOS performance levels were measured).

The QOS service advisor may route the communication to a communication path with a preferred performance level for the target application. Alternatively, the computers 104 may use the resulting knowledge of the QOS performance level to tune a parameter of the communication algorithm employed by the application. For instance, a QOS service advisor in the computer 104 can adjust the parameter of a forward error correction (FEC) algorithm to a selected level so that it can protect the communication against burst packet losses that might be encountered during the communication session. In the alternative, or in addition, the QOS service advisor can increase the size of the de jitter buffer so that the buffer is large enough to counter changes in the packet delivery latency on the particular communication path involved in the communication. As such, the subjective interactive experience of the users (because the FEC decoding, de jitter buffer re-sizing, or other adjustments have been applied) can be improved.

Furthermore, users 102 might wish to use other applications 108 (too numerous for complete enumeration herein) which seek to provide real-time experiences. For instance, users 102 often wish to stream many types of audio, visual, audio/visual and other content from servers and other content sources. Moreover, whereas the network 100 illustrated by FIG. 1 provides capabilities consistent with subjectively rated real-time performance, the network 100 also provides improved capabilities for non-real-time applications 108 such as those that exchange relatively static information (for instance, text files, comma delimited files, slowly updated information, etc.)

Figure 2:
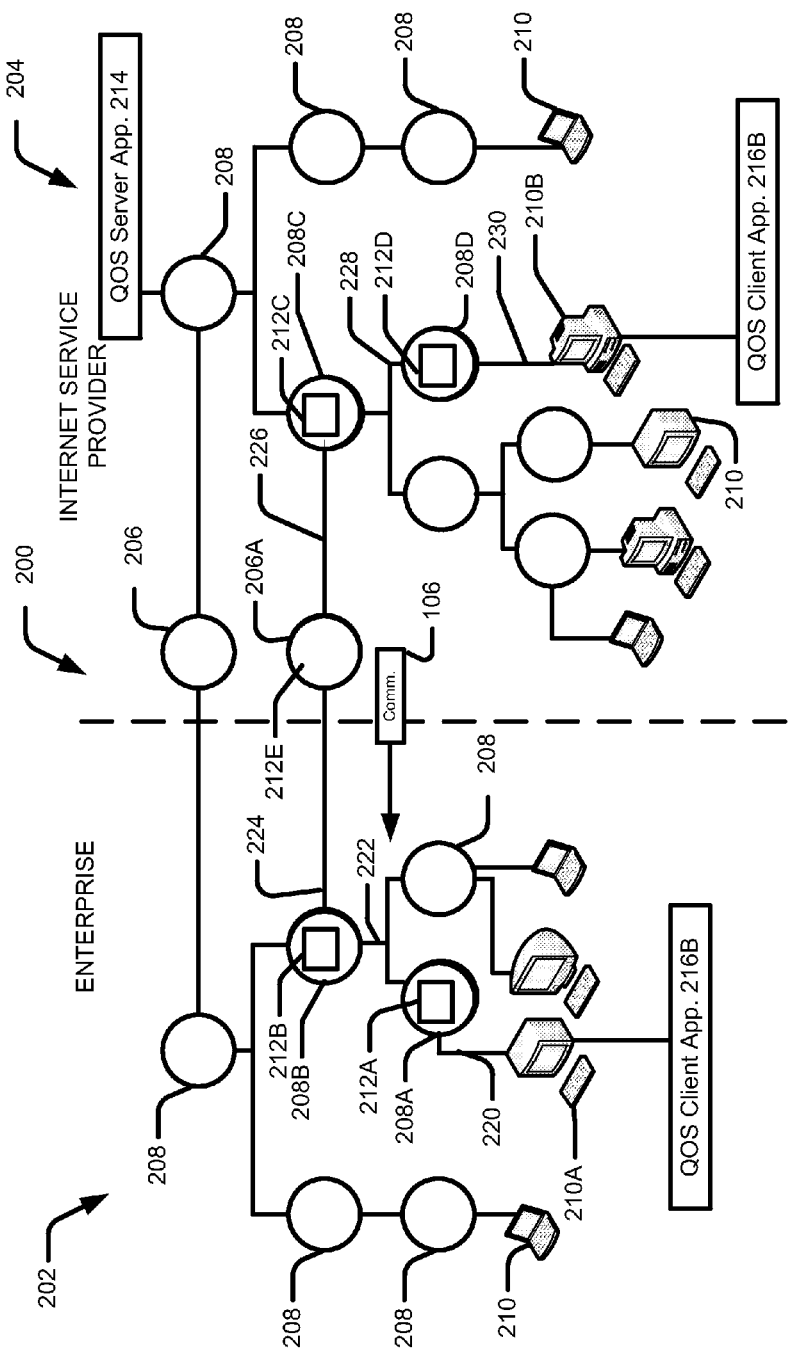
FIG. 2 is an illustrative schematic diagram of a networked environment within which a QOS-based routing service is implemented.

FIG. 2 depicts an illustrative schematic diagram of a networked environment 200 within which the QOS service 110 (see FIG. 1) is implemented. The networked environment 200 includes two mesh networks 202 and 204 and a variety of routing equipment such as routers 206 (which might be positioned in a variety of locations in the networked environment 200) and software which route communications between the various entities within the mesh networks 202 and 204 (and/or in communication therewith). Many mesh networks 202 and 204 take the form of hierarchical trees to save on the costs of building the networks (the cost of constructing the network is frequently correlated with the length of the branches of the network), nevertheless, other networks may take mesh form to allow more efficient and flexible routing of information between the users of the network. The mesh networks 202 and 204 typically include various servers 208 from which users 102 request and receive various services, information, etc. The users 102 employ a variety of computing and/or communication devices to perform these functions. Throughout the communication sessions involved in such information exchanges, various routers, network segment, servers may be employed to facilitate the communication among the users. FIG. 2 illustrates these various end-user devices with computers 210.

Moreover, the mesh networks 202 and 204 can be organized in a variety of ways. For instance, mesh network 204 includes the servers 208 and computers 210 of an enterprise. Thus, the various servers 208 of mesh network 204 happen to reflect the organizational scheme of the enterprise. As a result, the top level server 208 might be one of the headquarters servers 208 of the enterprise. Other servers 208 within mesh network 204 might represent various branches, subsidiaries, manufacturing sites, offices, etc. of the enterprise. In contrast, an internet service provider (ISP) owns the mesh network 202. Thus, the various servers 208 of mesh network 202 include servers from various geographic areas, regions, etc. served by the ISP and which are arranged in a geographic hierarchy. Of course, other hierarchic schemes are included within the scope of the disclosure herein.

With regard to the users 102 (see FIG. 1), they are each typically associated with one of the computers 210. These computers 210 communicate with the servers 208 and host applications and other software which allow the users 102 to access information and services anywhere within the mesh networks 202 and 204 and at locations in communication therewith. Throughout the mesh networks 202 and 204, various entities 212 (be they software objects, programs, applications, modules, hardware, users, etc.) are hosted by the various pieces of equipment 208, 210, etc). These entities 212 therefore exchange communications 106 (see FIG. 1) whether in real-time or not.

It might be useful to note at this juncture that whereas the mesh networks 202 and 204 are shown as hierarchies in the figure (in which communications might be implied to flow only in the vertical directions of "up" and "down" in the hierarchies), various entities 212 hosted therein communicate with entities 212 elsewhere than above or below them on the mesh networks 202 and 204. In other words, the entities 212 resident on the mesh networks 202 and 204 can employ peer-to-peer, horizontal, and other extra-hierarchic communication paths. As a result, in many situations, more than one communication path might exist between any two entities 212.

With continuing reference to FIG. 2, some or all of the entities 212 might detect and locate one another on the mesh networks 202 and 204. More particularly, the various entities 212 (operating as peers) can obtain the ASIDs (the AS numbers of the network providers), PIDs (peer-IDs), sub-region information regarding the location of their peers (as suggested by the provider portal for P2P applications in a P4P framework), and LOCs (geographic location) associated with the other entities 212 via appropriate protocols. In the alternative, the entities 212 can detect the presence of other entities 212 within the mesh networks 202 and 204 or can learn of such other entities 212 by performing a DSN inquiry (or through other non-limiting techniques and technologies).

Regardless of the techniques and technologies used to identify the other entities 212, when one entity 212 desires to communicate with another entity 212, the transmitting entity 212 establishes a communication path to the receiving entity. Of course the communication path can include one or more of the routers 206 and/or one or more servers 208.

In accordance with various embodiments, the transmitting entity 212 can submit to the QOS service 110 (see FIG. 1) the QOS performance level it observed on the established communication path 106 and/or the other communication paths 106. As discussed above, that communication path might involve multiple servers, network or communication path segments, etc. Thus, as part of determining the performance levels of these various path segments, the QOS service 110 can identify the set of servers, path segments, etc. in the communication path. The QOS service 110 can identify these path segments by either obtaining the information from the transmitting entity 212 or from a network database. Meanwhile, the QOS service can continue receiving submittals from various entities (regarding various communication paths), identifying the path segments, devices, entities, etc. involved in the corresponding communications, and determining the corresponding performance levels of the involved path segments, devices, entities, etc. As the QOS service 110 receives additional submittals, its ability to determine the performance levels of the corresponding path segments increases accordingly. From these determined path segment performance levels, the QOS service can predict the performance level of various communication paths in the mesh networks 202 and 204.

The various entities (for instance, clients) may query the QOS service 110 (see FIG. 1) for determined (and measured) QOS performance levels pertaining to the various communication paths which might exist between themselves and their intended recipient entities 212. Since the QOS service 110 is able to infer the individual QOS performance levels of path segments in the mesh networks 202 and 204, the QOS service 110 is able to answer the query of the requesting entity even if there is no submittal for the particular communication path for which the entity submitted the query. As is disclosed further herein, the QOS service 110 is implemented with a QOS server application 214 and one or more QOS client applications 216 as illustrated by FIG. 2. Regardless of the implementation of the QOS service 110 (be it with QOS server application 214 and QOS client applications 216 or otherwise), using the determined QOS performance levels returned from the QOS service 110, the requesting entity 212 selects a particular communication path which it determines suitable for the particular communication 106 to be transmitted. For instance, if the transmitting entity 212 wants to ensure the integrity of the communication 106, the transmitting entity 212 can choose a communication path with a low determined packet loss rate. In the alternative, or in addition, the transmitting entity 212 might modify the error detection and correction techniques and technologies to be used to protect the integrity of the communication 106.

With continuing reference to FIG. 2, the entity 212 which requests the determined QOS performance levels can specify any pair (or more) of entities 212 (perhaps, more often then not, including itself) which it wishes to involve in the communication 106 associated with its request. The QOS service 110 then returns, responsive to such a request, determined QOS performance levels pertaining to the possible communication paths between the specified entities 212. In this manner a router 206 (for instance) learns of determined QOS performance levels pertaining to two or more entities 212 and sets up a communication channel there between according to the determined QOS performance levels.

Having briefly discussed how various entities use the determined QOS performance levels, this document now discloses how the QOS service 110 determines the determined QOS performance levels. More particularly, the QOS service 110 determines the determined QOS performance levels in a variety of manners. For instance, in various embodiments, the QOS service 110 includes a QOS server application 214 with at least some of the computers 210 hosting QOS client applications 216. The top level server 208 or other servers 208 of one of the mesh network 202 and 204 can host the QOS server application 214.

The QOS client applications 216 monitor the communications of their corresponding computers 210 and measure QOS performance levels related to the communications 106 from their computers 210. For instance, as a communication 106 leaves (or arrives at) a particular computer 210, the QOS client application 216 measures various QOS performance levels related to the communication 106. Network performance levels such as latency, packet loss rate, transmission rate, bandwidth, etc. represent some of the QOS performance levels which the QOS client applications 216 measure.

The QOS client applications 216 also store the measured QOS performance levels in conjunction with the time, date, communication path involved, and other information pertinent to the communications 106. The QOS client applications 216 can submit the measured QOS performance levels to the QOS server application 214 as soon as the measurement occurs. In the alternative, the QOS client applications 216 can wait to submit that information. For instance, the QOS client applications 216 can wait to submit the information until they have measured some selected number of QOS performance levels; until they have monitored some selected number of communications 106; or until they have measured QOS performance levels for some selected number of communication paths (to name but a few of many possibilities).

In some embodiments, one or some number of computers 210 host an instance of the QOS client application 216. Accordingly, when a user 102 such as a system administrator decides to deploy the QOS service 110, the user 102 can select certain computers 104 on which to begin gathering measured performance levels. As that computer 210 operates, it begins gathering measured performance levels for the various communication paths that it has actually used. Thus, a portion of the networked environment 200 which enjoys particular pertinence (based on historic usage, current usage, and/or other considerations) with respect to that computer 210 receives more QOS related monitoring than other areas of the networked environment 200.

As time, resources, etc. permit, the user 102 can gradually deploy instances of the QOS client application 216 to additional computers 210. These additional QOS client applications 216 allow additional areas of the networked environment 200 to be monitored for QOS related information. Thus, not only may a user 102 gradually deploy the QOS service 110, but the user 102 may also target areas of a networked environment 200 for QOS related monitoring. Moreover, the QOS service 110 can provide the computers 210 and their associated users 102 and/or entities 212 in these targeted areas (as well as other areas) of the networked environment 200 with an improved (or selected) level of QOS related performance (by routing communications 106 in accordance with the determined QOS performance levels).

Figure 3:
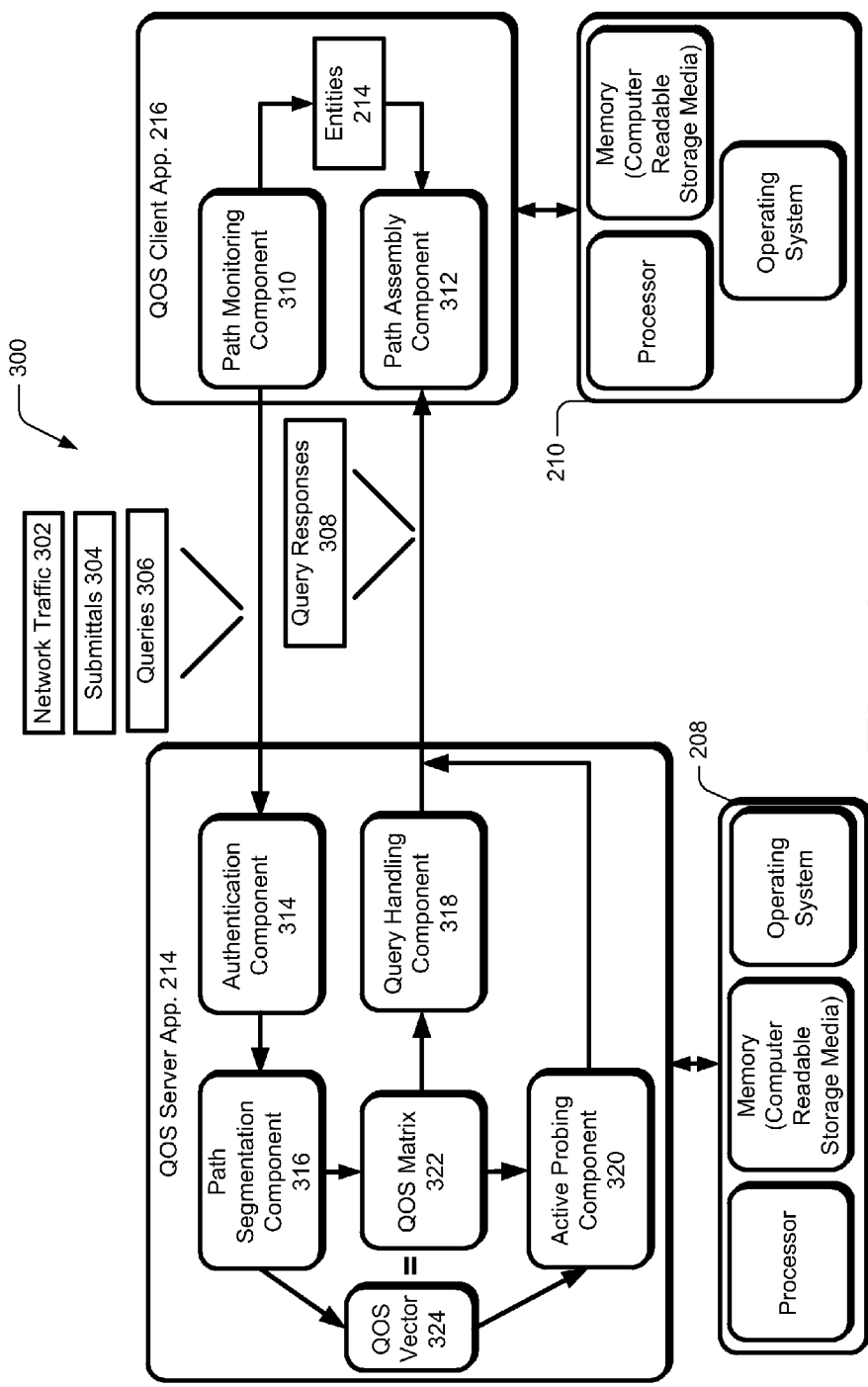
FIG. 3 is an illustrative block diagram of a QOS-based client/server routing system.

Among other functions, the illustrated QOS server application 214 maintains a QOS matrix and a QOS vector as this document discloses further with reference to FIG. 3. The QOS server application 214 stores the information submitted by the various QOS client applications 216 in the QOS vector organized according to the permutations of the communications paths of the mesh networks 202 and 204. As illustrated by FIG. 2, each of the communication paths include one or more path segments 220, 222, 224, 226, 228, and 230 and one or more pieces of equipment such as the transmitting and receiving computers 210, various servers 208 and various routers 206. In addition, the communication paths often involve one or more entities 212 hosted by the equipment and which may be involved in the traversal of communications 106 over the communication paths. Likewise, a path segment 220, 222, 224, 226, 228, and 230 can include various entities and devices. Moreover, the communication paths and communication path segments 220, 222, 224, 226, 228, and 230 can be contained within a mesh network 202 or 204 or can straddle boundaries between mesh networks 202 and 204. The communication paths and path segments 220, 222, 224, 226, 228, and 230 can, in addition or in the alternative, be contained within, operated, or controlled by one or more organizations (for instance, an ISP or enterprise).

Using packet loss rate as an illustrative performance level, the end-to-end packet loss rate between two computers 210A and 210B can be denoted as $p_{210A-210B}$. Also, the packet loss rate on the individual path segments can be denoted as $p_{220}$ for path segment 220, and so on. In addition, the packet loss rate on the servers, the routers, etc. can be denoted as $p_{208}$ for the servers 208, and so on. The end-to-end packet loss rate and that of the individual path segments (such as communication paths, servers and routers) can be related as follows: $(1-p_{210A-210B})=(1-p_{220})*(1-p_{222})*(1-p_{224})*(1-p_{226})*(1-p_{228})*(1-p_{230})*(1-p_{208})*(1-p_{206})$. In log space, the above relationship is represented in linear terms. The QOS service 110 obtains end-to-end terms, such as $(1-p_{210A-210B})$, from the client submittals. The QOS service 110 can use deterministic or probabilistic methods to determine the individual terms, such as $(1-p_{220})$ and $(1-p_{208})$, etc. The QOS service 110 maintains the inferred terms for each path segment, server, router, etc. In a similar fashion, the QOS service 110 can maintain terms about latency, bandwidth, throughput, etc. for each path segment, server, router, etc.

It might be worth noting that, for latency and other performance levels, the relationship between end-to-end and individual components is linear (i.e., the end-to-end latency is the sum of all the latencies on the individual components). For bandwidth, throughput, and perhaps other performance levels, the end-to-end measure is the minimum performance level of the individual components. Other types of relationships are also within the scope of the disclosure.

For instance, FIG. 2 depicts an illustrative communication path which connects an entity 212 on computer 210A with an entity 212B on computer 210B over path segments 220, 222, 224, 226, 228, and 230, servers 208A-D, and router 206A and through one or more entities 212A-D which are hosted by those pieces of equipment. Each path segment 220, 222, 224, 226, 228, and 230, entity 212, and piece of equipment contributes to the performance (or lack thereof) of the communication path. Thus, a measured QOS performance level will reflect the performance levels of each of the path segments 220, 222, 224, 226, 228, and 230, the entities 212, and the equipment involved in the monitored communication 106. Accordingly, the QOS server application 214 can store the measured performance levels of the various communication paths as a vector with each element of the vector representing the performance level of one communication path.

However, information regarding the performance of one communication 106 or communication path may be of limited value in predicting the performance of another communication 106 or communication path. This condition exists because one communication 106 may follow a completely or partially different communication path than another communication 106. Additionally, whereas two communication paths might share a particular path segment 220, the performance of that particular path segment may not be determinative of the performance of either communication path. Indeed, communications 106 may traverse communication paths which are partially disjoint and partially overlapping with one another. Thus, as the QOS client applications 216 measure QOS performance level for certain communications 106 and certain communication paths, the QOS server application 214 gathers this information and correlates it to predict QOS performance levels for subsequent communications 106 and other communication paths.

More particularly, the QOS server application 214 maintains the QOS matrix wherein each row corresponds to a communication path and each element thereof represents a to-be-determined performance level of a path segment 220, 222, 224, 226, 228, and 230, entity 212, or piece of equipment (hereinafter a "path segment") on that communication path. By setting the vector of measured QOS performance levels (for the communication paths) equal to the matrix of to-be-determined QOS performance levels (for the path segments 220, 222, 224, 226, 228, and 230 et al) and solving the QOS matrix for some or all of its elements, the QOS server application 214 determines the performance levels for the path segments 220, 222, 224, 226, 228, and 230 involved in the communications 106. Furthermore, the QOS server application 214 can solve the QOS matrix in either a deterministic manner or a probabilistic manner. In the latter case, the determined QOS performance levels will be estimates. Moreover, as the amount of information stored in the QOS vector (i.e., the number of measured QOS performance levels) increases, the accuracy of those estimates will likely increase in a corresponding fashion.

However, it may not be necessary to solve the QOS matrix for the QOS performance levels of each of the path segments. Rather, the QOS matrix can be solved for only those performance levels which might affect the communications paths of interest. Moreover, the QOS server application 214 can wait until it receives a request to determine these performance levels so as to conserve processing resources for other purposes.

In the alternative, or in addition, the QOS server application 110A can be configured to use knowledge of the hierarchical nature of the mesh networks 202 and 204. For instance, since certain computers 210 will typically route their communications 106 through the server 208 which is closest to them within the particular mesh network 202 or 204, not all permutations of the various communication paths need be considered. Moreover, it may be known beforehand that for various reasons a subset of the computers 210 will probably only use a subset of the routers 206 (or other equipment, path segments 220, 222, 224, 226, 228, and 230, or entities 212). Accordingly, the size and/or complexity of the QOS vector, the QOS matrix, and the processing associated with determining the individual QOS performance levels is greatly reduced in such embodiments.

In addition, by using information regarding the hierarchic nature of the mesh networks 202 and 204, the QOS service 110 can be gradually deployed over the mesh networks 202 and 204. Similarly, the QOS service 110 allows the users 102 (or a system administrator) flexibility in its use. For instance, certain path segments 220, 222, 224, 226, 228, and 230 (and therefore subsets of the mesh networks 202 and 204) can be considered, or left out, of the QOS matrix as desired. Moreover, these (or even other or new) path segments 220, 222, 224, 226, 228, and 230 can be considered or added to the QOS matrix as the user desires.

In yet another alternative technique (or in addition to the foregoing techniques and technologies), the various entities 212 and pieces of equipment of the mesh networks 202 and 204 can be configured to register their presence and location in the mesh networks 202 or 204. As part of the registration process they can also register the various communication paths which they intend to use, which they are likely to use, or which they eventually end up using. Again, the effect of such techniques and technologies allows the QOS server application 214 to store less information, perform fewer steps to determine the individual QOS performance levels, and/or to deliver the determined QOS performance levels to the requesting entity 212 in a more timely fashion.

In some embodiments, the QOS server application 214 can be configured to passively receive the QOS related submittals from the various entities 212 and/or to actively probe the mesh networks 202 or 204 to determine (at its own initiation) QOS related performance levels. For instance, the QOS server application 214 can determine (based on its knowledge of the entities 212 and communications paths potentially involved in an eminent communication) that it has no current information in the QOS matrix regarding the performance level of a particular path segment 220, 222, 224, 226, 228, or 230 that might be of interest. In such cases, the QOS server application 214 can direct a monitored communication (or a series thereof) through the currently unmonitored path segment(s) 220, 222, 224, 226, 228, or 230. One result of this technique is that it allows the QOS server application 214 to actively gain information to insert into the QOS vector. Inserting that information allows the QOS server application 214 to determine the heretofore unknown (or stale) QOS performance level(s). The QOS server application 214 can also be configured to perform such active probing upon request, according to a schedule, according to unknown/missing elements of the vector, according to other user desires, etc.

The mathematical framework of one QOS inference algorithm which the QOS service 110 can employ can be further described as follows. Let the QOS performance level of the path segments (for instance individual servers, network segment, etc.) can be denoted as a vector $$Q=\{q_i\}, i=1,\ldots,M \qquad \text{Eq. 1}$$

where i indexes the server and network segment. Let the submittals of the entities 212 to the QOS service 110 be denoted as a vector:

$$P=\{p_j\}, j=1,\ldots,N \qquad \text{Eq. 2}$$

where j index the jth submittal received by the QOS service 110. Let a connection matrix be denoted as:

$$A=\{a_{i,j}\}, i=1,\ldots M, j=1,\ldots,N \qquad \text{Eq. 3}$$

where $a_{i,j}=1$ indicates that the ith path segment corresponds to the jth submittal, and $a_{i,j}=0$ indicates that the ith path segment is not involved in the communication path for the jth submittal. The QOS service 110 thus solves the minimization problem (as represented by Eq. 4) for the QOS performance level vector Q given the connection matrix A and the QOS submittal vector P.

$$\min_Q f(Q,A,P) \qquad \text{Eq. 4}$$

Since Eq. 4 might be insufficiently constrained, it might be the case that more than one solution exists for Eq. 4. In other words, Eq. 4 might not always lead to a unique solution.

Thus, the QOS service 110 can use minimum mean square error (MMSE) estimation (or other techniques) to identify one of these solutions as a solution reflecting actual performance levels. Therefore the MMSE of some embodiments takes the form:

$$\min_Q \|P-A^T Q\|^2 \qquad \text{Eq. 5}$$

In order to obtain the QOS performance levels of the various path segments that correspond to conditions in the mesh networks 202 and 204, the QOS service 110 can use a priori knowledge. For instance, one of the available pieces of a priori knowledge is that most servers typically operate nominally, without performance issues. Moreover, most path segments are not congested and thus have few delays packet losses, etc. Using such a priori information, the QOS service 110 can use modified versions of the MMSE as shown in Eqs. 6 and 7:

$$\min_Q \|P-A^T Q\|^2 + \alpha \|Q\|^0 \qquad \text{Eq. 6}$$

or $$\min_Q \|P-A^T Q\|^2 + \beta \|Q\|^1 \qquad \text{Eq. 7}$$

Where $\alpha$ and $\beta$ are weighting parameters. The MMSE modification represented by Eq. 6 reduces the number of non-zero items ($l_0$ norm) in the QOS performance level vector Q. However, the MMSE modification represented by Eq. 6 can be used where combinatorial optimization issues arising there from are unlikely or can be dealt w. In comparison, the MMSE modification represented by Eq. 7 reduces the $l_1$ norm of QOS performance level vector Q. Thus, Eq. 7 can usually be solved efficiently by a convex programming algorithm.

In the alternative, or in addition, to the foregoing MMSE-based approaches, the QOS service 110 can model the performance of the mesh networks 202 and 204 (i.e., Eq. 4) via a maximal likelihood estimation formula such as Eq. 8:

$$\max_Q \text{Prob}(P|Q) \qquad \text{Eq. 8}$$

or through a maximum a posterior formula such as Eq. 9:

$$\max_Q \text{Prob}(P|Q)\text{Prob}(Q) \qquad \text{Eq. 9}$$

Moreover, the QOS service 110 can solve Eqs. 8 and/or 9 via probabilistic techniques such as Belief Propagation. In addition, or in the alternative, the QOS service 110 can determine, estimate, etc. the performance of various communication paths or path segments 220, 222, 224, 226, 228, and 230 using minimum mean square error (MMSE) estimation, MMSE estimation with a further penalty by $l_0$ norm, MMSE estimation with a further penalty by $l_1$ norm, maximally likelihood estimation, maximum a posterior estimation, or other techniques. It might also be worth noting that the QOS service 110 can do so whether the communication path (or path segment 220, 222, 224, 226, 228, and 230) includes merely passive components (for instance an Ethernet cable) or active components such as for instance routers 206, servers 208, or computers 210.

Turning now to FIG. 3, the figure depicts an illustrative block diagram of a QOS-based client/server routing system 300. More particularly, FIG. 3 depicts a QOS client application 216 and a QOS server application 214 hosted, respectively by a computer 208 and server 208 although these applications could instead be distributed among various computing/communication devices. The QOS client applications 216 and the QOS server application 214 communicate over the network 100 or a portion thereof as may be desired.

In some embodiments, communications between the QOS client applications 216 and the QOS server application 214 "piggyback" on normal network traffic 302 between the computers 210 and one of the servers 208 (or other equipment) which host these applications. For instance, the submittals 304, queries 306, and query responses 308 between the QOS client application and the QOS server application 108 can be packaged in unused space in network control signals between the hosting equipment. The advantages of allowing the QOS client/server communications 304, 306, and 308 to piggyback on existing network traffic 302 includes causing little or no impact on the communication paths (and entities 212 and related equipment) which are called upon to handle these communications 304, 306, and 308.

With continuing reference to FIG. 3, the QOS client application 216 includes two or more components: a path monitoring component 310 and a path assembly component 312. The path monitoring component 310 intercepts communications 106 (see FIG. 1) originating from entities 212 within the client computer 210 and measures QOS performance levels pertaining thereto. The path monitoring component 310 also inserts the measured QOS performance levels into the network traffic 302 messages to form the submittals 304 for transmission to the QOS server application 214.

With further reference to FIG. 3, the path assembly component 312 receives the query responses 308 from the QOS server application 214. Moreover, the path assembly component 312 parses those query responses 308 to identify QOS performance levels for the individual path segments 220, 222, 224, 226, 228, and 230 which might be of interest to the entities 212 within the computer 210. The path assembly component 312, upon detecting that an outgoing communication 106 has been created, examines the determined QOS performance levels that might be useful for routing the outgoing communication 106 to select an overall communication path suitable for that communication 106. For instance, the communication can be routed on an optimal communication path for that communication.

In selecting that communication path(s), the path assembly component 312 can consider user selected criteria, criteria based on current (or recent) network conditions, etc. Moreover, it may sometimes be the case that the determined QOS performance levels for some of the pertinent path segments 220, 222, 224, 226, 228, and 230 might be stale or unavailable. In such cases, the path assembly component 312 can use the available (and fresh) QOS performance levels, the stale QOS performance levels, historical QOS performance levels (stored in the computer 210), user defined rules, user preferences, etc. to select a communication path for the outgoing communication 106 despite the missing information. Thus, the QOS client application 216 measures QOS performance levels for various communication paths, submits those QOS performance levels to the QOS server application 214, and assembles communication paths for the entities 212. Note that herein, the term "assemble a communication path" means, inter alia, to select those path segments 220, 222, 224, 226, 228, and 230 that will form a communication path.

With continuing reference to FIG. 3, the QOS server application 214 includes various components including an authentication component 314, a path segmentation component 316, a query handling component 318, and an active probing component 320. With these components, the QOS server application 214 creates and manages the QOS matrix 322 and the QOS vector 324. More specifically, the authentication component 314 receives purported submittals 304 from the mesh networks 202 or 204 and determines whether a trusted QOS client application 216 actually created and transmitted the submittals 304. In some non-limiting embodiments, the authentication component 314 uses public/private key encryption techniques and technologies to authenticate the submittals 304. If a particular submittal 304 fails authentication, the authentication component 314 can reject the submittal 304, issue an alert to one of the users 102 (for instance a system administrator), request that the submittal 304 be resubmitted, etc. Thus, the authentication component 314 helps to ensure the integrity of the submittals 304 and the QOS matrix 322 built from information therein. More particularly, the authentication component 314 ensures that falsified QOS performance levels will typically not be allowed into the QOS vector 324.

The authentication component 314 also forwards authenticated submittals 304 to the path segmentation component 316. More particularly, since the submittals 304 contain not only the measured QOS performance levels associated with the particular communications 106 but also an identification of the transmitting entities 212, the recipient entities 212, and the particular communication paths used for those communications 106, the path segmentation component 316 identifies which row of the QOS vector 324 will be affected by the submittal 304. Moreover, the path segmentation component 316 identifies which elements in that row (i.e., path segments 220, 222, 224, 226, 228, and 230) are potentially pertinent to the submitted performance level. Thus, when particular path segments 220, 222, 224, 226, 228, and 230 will not be involved in the communications 106, the corresponding elements of the QOS matrix 322 can be set to zero or otherwise excluded from further consideration (with respect to determining the current QOS performance levels of interest). Moreover, for each type of performance level of interest, the path segmentation component 316 can maintain a separate QOS matrix 322.

As the path segmentation component 316 receives additional submittals 304 for additional communications paths the QOS vector 324 reaches a state wherein enough measured QOS performance values are available to solve the set of simultaneous equations defined by the QOS vector 324 (containing measured QOS performance levels for various communication paths) and the QOS matrix 322 (containing to-be-determined QOS performance levels for various path segments 220, 222, 224, 226, 228, and 230). By solving the QOS matrix 322 the path segmentation component 316 determines the QOS performance levels for the various path segments 220, 222, 224, 226, 228, and 230. It might be worth noting here that a complete solution of the QOS matrix 322 might not be necessary or even desirable in some situations. For instance, when enough information exists therein to solve for a particular QOS performance level of a particular path segment 220, 222, 224, 226, 228, or 230, that QOS performance level can be determined without waiting for additional information to be included in the QOS vector 324.

The techniques and technologies that the path segmentation component 316 uses to solve the QOS matrix 322 include deterministic methods and probabilistic techniques and technologies. For instance, the path segmentation component 316 can use linear algebra to solve the set of simultaneous equations corresponding to the rows of the QOS matrix 322 and the QOS vector 324. In the alternative, or in addition, the path segmentation component 316 can apply linear regression or probabilistic techniques and technologies to the QOS matrix 322 and the QOS vector 324 to estimate the various performance levels of the path segments 220, 222, 224, 226, 228, and 230 from the information contained in the submittals 304.

With continuing reference to FIG. 3, the query handling component 318 receives queries 306 from either the various entities 212 or directly from the users 102 (via, for instance, keyboard inputs at the server 208 which hosts the QOS server application 214). Typically, these queries 306 include an identification of a pair of entities 212 which are likely to communicate. In addition, these queries 306 can identify a communication path or a portion thereof which the entities 212 might wish to use for a particular communication 106. In any case, the query handling component 318 parses the query 306 and examines the QOS matrix 322 to determine the performance levels for the various path segments 220, 222, 224, 226, 228, and 230 that could be used (or will need to be used or that have been designated to be used) to assemble the various communication paths between the specified entities 212.

When one or more of the performance levels for the various path segments 220, 222, 224, 226, 228, and 230 (and entities 212) has not been determined or is stale, the query handling component 318 can invoke the active probing component 320 to measure additional QOS performance levels concerning the mesh networks 202 and 204. For instance, the active probing component 320 could route a communication 106 from itself, through the path segments 220, 222, 224, 226, 228, and 230 with missing determined QOS performance levels to generate additional measured QOS performance levels (of certain communication paths of interest). The active probing component 320 then sends submittals 304 to the path segmentation component 316. As a result, the path segmentation component 316 further populates the QOS vector 324 and solves the QOS matrix 322 for the previously unknown QOS performance levels (for the path segments 220, 222, 224, 226, 228, and 230 of interest). In some instances, the active probing component 320 can generate several (or more) such communications 106 until the QOS matrix 322 is sufficiently populated to solve for the pertinent QOS performance levels or until some user specified limit is reached (for instance, a minimum or a maximum number of such communications 106 or some length of time) has been reach.

At some point, though, the query handling component 318 extracts the available QOS performance levels from the QOS matrix 322. Moreover, the query handling component 318 generates a message conveying the query response 308 or inserts the query response 308 into a message associated with normal network traffic 302. The query handling component 318 then transmits the query response 308, including the determined QOS performance levels (for the pertinent path segments 220, 222, 224, 226, 228, and 230), to the requesting QOS client application 216.

Upon receipt of the query response 308, the path assembly component 312 of the QOS client application 216 parses the query response 308 for the determined QOS performance levels of the pertinent path segments 220, 222, 224, 226, 228, and 230. From the determined QOS performance levels and from knowledge of the mesh networks 202 and 204, the path assembly component 312 assembles a communication path for the outgoing communication(s) 106. The path assembly component 312 then routes the outgoing communication along that communication path.

The path assembly component 312 can take a number of other actions pertaining to the outgoing communication 106. For instance, depending on the determined QOS performance levels in the query response 308, it might adjust the error detection and correction techniques and technologies to be used for the outgoing communication 106 and any responses thereto. In other cases, the path assembly component 312 could establish a primary communication path and one or more secondary communication paths. Thus, should the primary communication path fail or become degraded (i.e.,  some performance level falls below or rises above a threshold), the path assembly component 312 could re-route the communications 106 to the secondary communication path. In other scenarios, the path assembly component 312 could choose to establish multiple communication paths for a communication 106 or for an exchange of communications 106 in order to increase the effective bandwidth between the entities 212 involved therein. In any case, the path assembly component 312 can choose a communication path(s) as may be suited for a particular communication 106, entity 212, user 102, etc.

Figure 4:
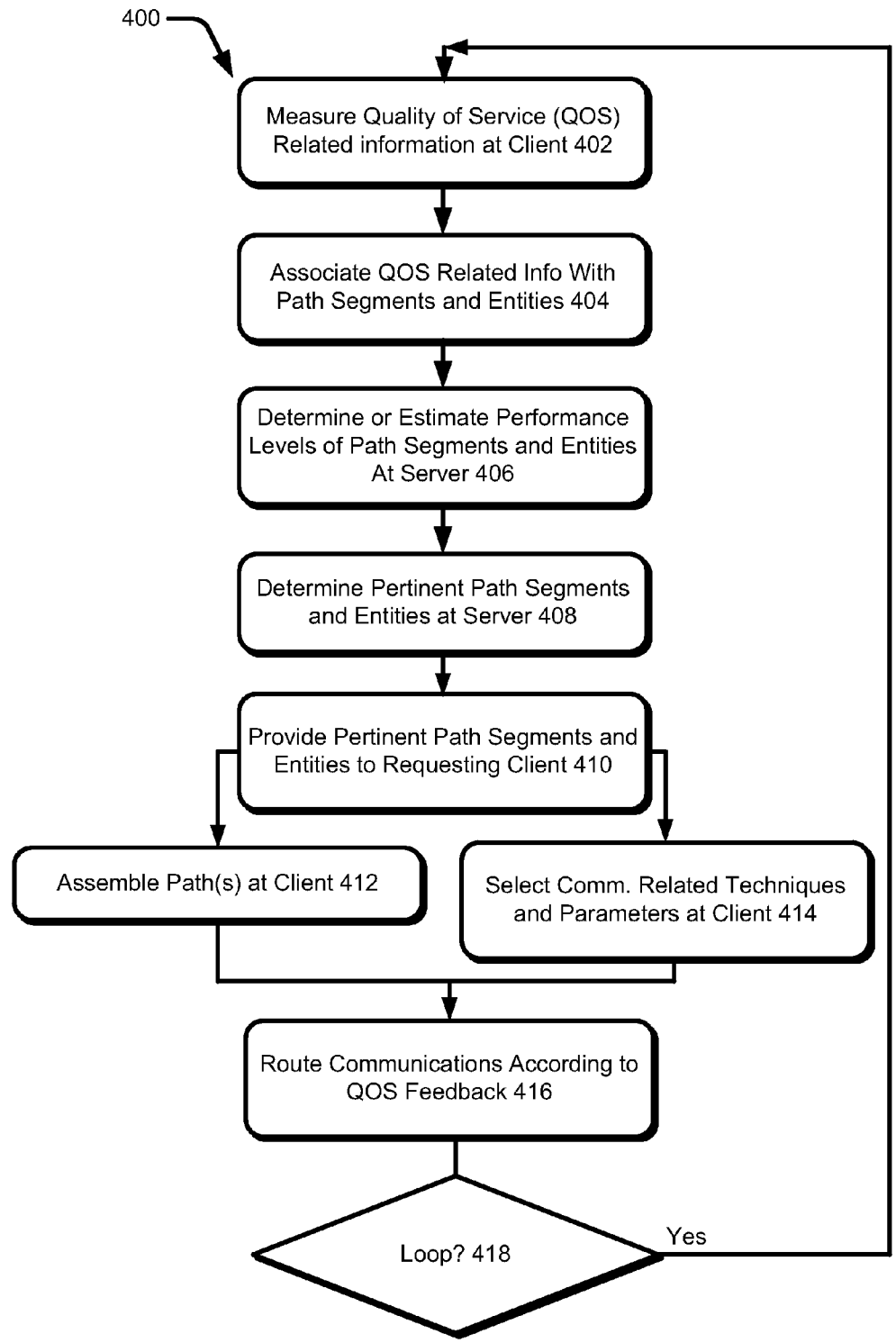
FIG. 4 is an illustrative flow chart of a method of routing communications using a QOS-based client/server system.

FIG. 4 depicts an illustrative flow chart of a method 400 of routing communications using the QOS-based client/server routing system 300. More specifically, FIG. 4 illustrates that the method 400 includes various steps such as step 402 at which QOS client applications 216 measure QOS performance levels for various communication paths.

At step 404, the measured QOS performance levels are then associated with the path segments 220, 222, 224, 226, 228, and 230 involved in the communications 106. The association can be by way of populating the QOS vector 324 with the QOS related information and by setting the QOS vector 324 equal to the QOS matrix 322 (which contains the to-be-determined QOS performance levels for the path segments 220, 222, 224, 226, 228, and 230).

The method 400 also includes determining the QOS performance levels of some or all of the various path segments 220, 222, 224, 226, 228, and 230 in the mesh networks 202 and 204. For instance, the QOS matrix 322 can be solved in part or in whole. See step 406.

Then, responsive to a query 306 or for other reasons, the QOS performance levels of path segments 220, 222, 224, 226, 228, and 230 which might be used to assemble communication paths between various entities 212 are identified. See step 408.

The method 400 also includes providing the pertinent QOS performance levels (as determined in step 406) to the requesting entity 212 or to other entities 212 and/or users 102. See step 410.

Moreover, from the pertinent QOS performance levels, and from knowledge of the mesh networks 202 and 204, one or more communication paths can be assembled along which communications 106 can be routed as illustrated at step 412.

In the alternative, or in addition, various communication techniques and technologies, parameters, etc. can be chosen for the communications 106 and applied as desired. For instance, an error detection and correction schema can be chosen for the communication 106. See step 414. In some situations, the choice may be based on the determined QOS performance levels of the path segments 220, 222, 224, 226, 228, and 230 to be involved in the communication.

One or more communications 106 are then routed according to the communication path assembled in step 412 according to the QOS performance levels (for the path segments 220, 222, 224, 226, 228, and 230) fed back by the QOS-based client/server system 300. See step 416. Moreover, the communication techniques chosen in step 414 may be used during these communications.

Figure 5:
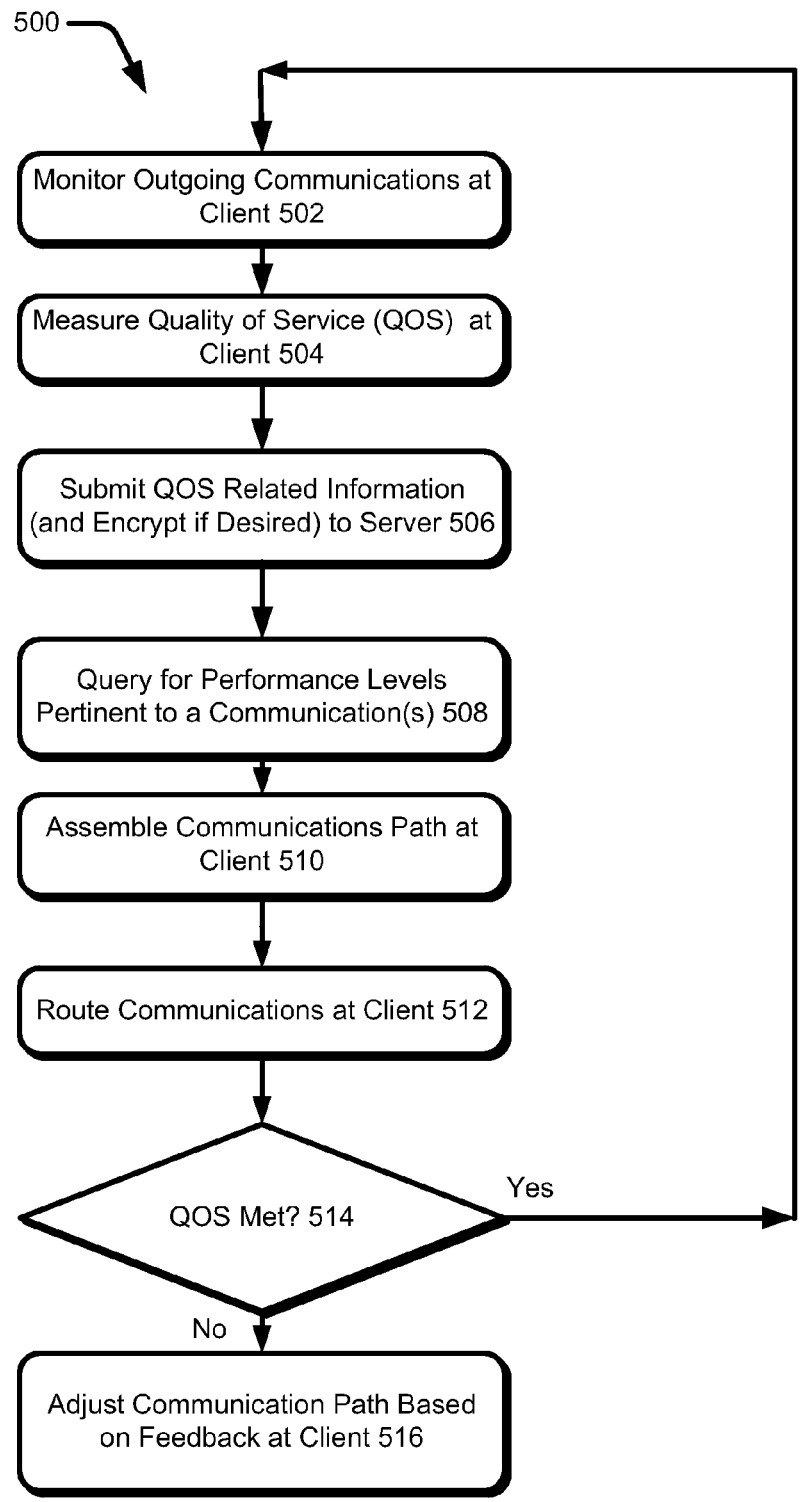
FIG. 5 is an illustrative flow chart of a method of routing communications using a QOS-based client application.

FIG. 5 depicts an illustrative flow chart of a method 500 of routing communications 106 using a QOS client application 216. The method 500 includes various steps such as step 502 at which the QOS client application 216 monitors communications 106 which are being transmitted from an entity 212 of the client computer or which are to be transmitted there from.

Step 504 illustrates that the QOS client application 216 can measure the QOS performance levels associated with some or all of these outgoing communications 106. The monitoring can include obtaining QOS performance levels associated with the communications from the operating system of the client computer, one of the routers or servers 208, or the network 202 or 204. In the alternative, the monitoring can include modifying the outgoing communication 106 to have QOS performance levels associated with the communication returned to the QOS client application 216 by some entity capable of measuring the desired QOS performance level.

At step 506, the QOS client application submits the measured QOS information to the QOS server application 214. In addition, the method 500 can include encrypting (or otherwise protecting) the measured QOS related information.

The method 500 also includes step 508 at which the QOS client application 216 queries the QOS server application 214 for QOS performance levels of path segments 220, 222, 224, 226, 228, and 230 which might be assembled into communication paths for communications 106 from entities 212 associated with the QOS client application 216.

At step 510, the QOS client application 216 assembles one or more communication paths to be used for routing communications 106 from the client computer. The QOS client application 216 uses the determined QOS performance levels (of the pertinent path segments 220, 222, 224, 226, 228, and 230) and knowledge regarding the mesh networks 202 and 204 to assemble the communication path.

The QOS client application 216 routes the communications 106 along the assembled communication path. See step 512.

As communications 106 are routed from the client computer, the QOS client application 216 monitors these communications 106 and determines whether the measured QOS performance levels associated with them satisfy the QOS level for that communication 106 (as selected by a user 102 or an entity 212). If the communication 106 meets the QOS level, the method 500 repeats from step 502 as illustrated by decision 514.

If the communication 106 fails to meet the selected QOS level, the QOS client application 216 adjusts the routing by again querying the QOS server application 214 and assembling another communication path. See step 516.

Figure 6:
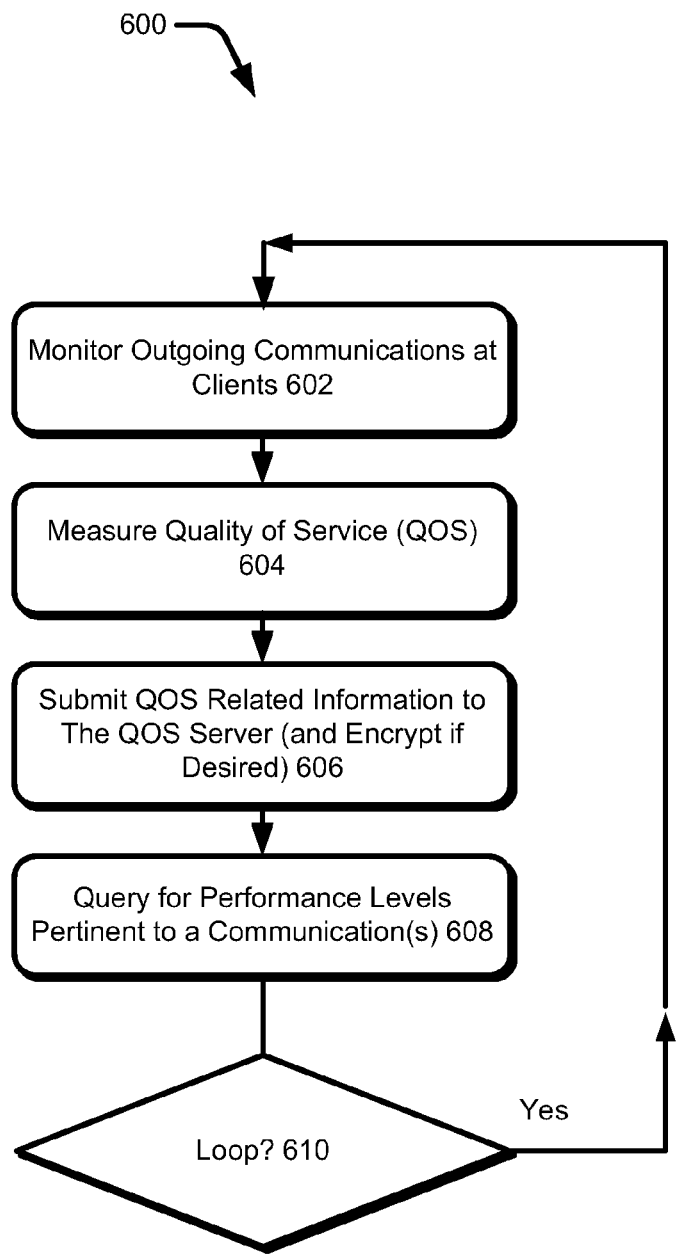
FIG. 6 is an illustrative flow chart of a method of routing communications using a QOS-based server application.

FIG. 6 depicts an illustrative flow chart of a method 600 of routing communications using a QOS server application 214. More particularly, FIG. 6 illustrates that method 600 includes the QOS server application 214 receiving and authenticating various submittals 304 of measured QOS performance levels from one or more QOS client applications 216. See step 602.

At step 604 the QOS server application 214 associates the measured QOS performance levels with the various path segments 220, 222, 224, 226, 228, and 230 which gave rise to those QOS performance levels. For instance, the QOS server application 214 can populate the QOS vector 324 with the measured QOS performance levels.

At some point, the QOS server application 214 receives a query 306 regarding potential communication paths between a pair of entities 212. See step 606.

At step 608, the QOS server application 214 determines the performance levels of path segments 220, 222, 224, 226, 228, and 230 that are potentially pertinent to the communications 106 between the entities 212 as specified by the query 306. For instance, the QOS server application 214 can solve the QOS matrix 322 in whole or in part to determine the potentially pertinent QOS performance levels.

The QOS server application 214 then sends the pertinent QOS performance levels (as determined in step 608) to the requesting entity 212. See step 610. The method 600 may loop for as long as desired.

Embodiments therefore provide networks with improved QOS performance levels particularly as they pertain to communications between entities. Moreover, the overall speed of these networks can be significantly increased by application of the techniques and technologies described herein. Communications may be routed more reliably at higher transmission rates and with less data loss than heretofore possible. Additionally, embodiments include feeding back QOS performance levels to improve the routing of communications within networks.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A QOS (Quality of Service) computer system comprising:
   a plurality of entities;
   at least one first server including a QOS service module; and
   a plurality of communication paths over which the entities are configured to communicate with one another in various combinations, the communication paths including a plurality of second servers and network segments;
   wherein:
      the QOS service module is configured to receive a first submittal created by an entity and containing an indication of a first performance level of a first communication path, the QOS service module being further configured to determine from multiple second submittals from multiple entities a second performance level of at least a portion of a second communication path which is partially disjoint from and partially overlapping the first communication path, the QOS service module being further configured to output an indication of the determined second performance level for the second communication path; and
      the entities are configured to query the QOS service module for determined performance levels of the communication paths.

2. The system of claim 1 wherein at least one of the communication paths includes at least one of the second servers and wherein the at least one second server included in the at least one of the communication paths contributes to the corresponding performance level.

3. The system of claim 1, wherein the plurality of second servers are configured to process or to relay messages among the entities and wherein the QOS service module is further configured to determine from the multiple second submittals one or more performance levels of one or more second servers in the first communication path.

4. The system of claim 1 wherein the first performance level is selected from a group consisting of an amount of latency, an amount of data loss, a bandwidth, a stability measure, a burst packet loss measure, and a throughput rate.

5. The system of claim 1 wherein the first server includes an authentication component configured to accept the first submittal from an application of a first entity of the plurality of entities and which is further configured to authenticate the first submittal as being from the first entity.

6. The system of claim 1, wherein the QOS service module is further configured to identify a particular path segment having a third performance level below a threshold and outputting an indication of the particular network segment.

7. The system of claim 1 further comprising a hierarchy of the communication paths, the QOS service module being further configured to use information regarding the hierarchy to eliminate at least one network segment from the determination of the second performance level.

8. The system of claim 1 further comprising an active probing component of the first server which is configured to determine a third performance level of a third communication path by communicating with an entity of the plurality of entities over the third communication path.

9. A computer comprising:
a path segmentation component configured to accept a first submittal from a first entity which contains an indication of a first performance level of a first communication path, the path segmentation component being further configured to determine a first partial path segment which is a portion of the first communication path and to determine a first partial performance level corresponding to the first partial path segment; and
a path assembly component in communication with the path segmentation component and being configured to determine a second performance level of a second partial path segment based at least partially on the first determined performance level of the first partial path segment and to output an indication of the determined second performance level of the second partial path segment, the second partial path segment being partially disjoint from and partially overlapping with the first communication path.

10. The computer of claim 9 wherein the computer is one of a server, a router, a portion of an enterprise network, or a portion of an ISP (Internet Service Provider).

11. The computer of claim 9 wherein the indication of the determined second performance level of the second partial path segments is a portion of a matrix which includes entries for a plurality of determined performance levels of a plurality of partial path segments.

12. The computer of claim 9 further comprising a query component configured to determine, from a plurality of performance levels corresponding to a plurality of partial path segments determined by the path assembly component, a communication path which is optimal with respect to a selected performance level for a communication involving a user selected combination of entities, the query component being further configured to output the optimal path.

13. The computer of claim 9 wherein the second performance level of the second partial path segment is determined by at least one of the following mathematical methods: minimum mean square error (MMSE) estimation, MMSE estimation with a first further penalty by $l_0$ norm, MMSE estimation with a second further penalty by $l_1$ norm, maximally likelihood estimation, or maximum a posteriori estimation.

14. A computer comprising:
a first entity hosted by the computer;
an interface in communication with the first entity and a plurality of communication paths;
a performance monitoring component configured to monitor communications between the first entity and one or more other entities over the communication paths, the performance monitoring component being further configured to create a first submittal containing an indication of a first performance level of a first communication between the first entity and a first other entity via a first communication path and being configured to send the first submittal to a QOS (Quality of Service) service device; and
a query component in communication with the QOS service device and being configured to query the QOS service device regarding a second performance level of a second communication path between the first entity and a second other entity and which is determined by the QOS service device based partially on the first submittal, the first communication path being partially disjoint from and partially overlapping the second communication path, the query component being further configured to receive an indication of the second performance level of the second communication path from the QOS service device.

15. The computer of claim 14 wherein the query component is further configured to adjust a de-jitter buffer of a voice decoder of the first entity based at least in part on the first performance level of the first communication path.

16. The computer of claim 14 wherein the query component is further configured to adjust a number of redundancies of a forward error correction component of the first entity based at least in part on the first performance level of the first communication path.

17. The computer system of claim 14 wherein the query component is further configured to display the indication of the second performance level of the second communication path.

18. The computer system of claim 14 wherein the query component is further configured to query the QOS service device regarding a plurality of performance levels of multiple communication paths and to select a communication path of the multiple communication paths with an optimal performance level for a communication of the first entity.

19. The computer system of claim 14 further comprising a QOS management component configured to select a primary communication path and a secondary communication path for communications of the first entity and which overlaps the first communication path less than the other communication paths, the selection being based on a plurality of determined performance levels corresponding to a plurality of communication paths, the QOS management component being further configured to direct communications of the first entity on to the first communication path and, in response to a QOS performance level of the primary communication path being below a threshold, to re-direct the communications of the first entity on to the secondary communications path.

20. The computer system of claim 14 further comprising a QOS (Quality of Service) management component configured to adjust a communications component of the first entity based at least in part on the QOS performance level of the first communication path.

* * * * *